(12) United States Patent
Zhao

(10) Patent No.: US 11,542,938 B2
(45) Date of Patent: Jan. 3, 2023

(54) POLISHED ROD ROTATION SENSOR

(71) Applicant: BODE INTELLIGENCE TECHNOLOGY CO., LTD., Xi'an (CN)

(72) Inventor: Min Zhao, Xi'an (CN)

(73) Assignee: BODE INTELLIGENCE TECHNOLOGY CO., LTD., Xi'an (CN)

(*) Notice: Subject to any disclaimer, the term of this patent is extended or adjusted under 35 U.S.C. 154(b) by 510 days.

(21) Appl. No.: 16/656,815

(22) Filed: Oct. 18, 2019

(65) Prior Publication Data

US 2021/0115914 A1    Apr. 22, 2021

(51) Int. Cl.
*E21B 47/009* (2012.01)
*F04B 51/00* (2006.01)
*G01D 5/244* (2006.01)
*E21B 17/00* (2006.01)

(52) U.S. Cl.
CPC .............. *F04B 51/00* (2013.01); *E21B 17/00* (2013.01); *E21B 47/009* (2020.05); *G01D 5/244* (2013.01)

(58) Field of Classification Search
CPC ........... F04B 2201/1208; E21B 43/127; E21B 43/126; E21B 47/009; E21B 47/008
See application file for complete search history.

(56) References Cited

U.S. PATENT DOCUMENTS

| | | | |
|---|---|---|---|
| 9,140,113 B2 | 9/2015 | Hurst et al. | |
| 9,506,751 B2 | 11/2016 | Zhao | |
| 9,689,758 B2 | 6/2017 | Zhao | |
| 9,952,073 B2 | 4/2018 | Zhao | |
| 9,983,076 B2 | 5/2018 | Zhao | |
| 2010/0006337 A1* | 1/2010 | Kosoric | E21B 15/04 175/57 |
| 2013/0181844 A1* | 7/2013 | Hurst | E21B 47/009 340/854.6 |
| 2015/0322634 A1* | 11/2015 | Stock | E01C 23/127 73/431 |
| 2016/0290074 A1* | 10/2016 | Gayer | E21B 33/03 |
| 2019/0203579 A1* | 7/2019 | Phillips | F04B 51/00 |
| 2020/0263531 A1* | 8/2020 | Fyfe | H04Q 9/00 |

* cited by examiner

*Primary Examiner* — Kipp C Wallace
(74) *Attorney, Agent, or Firm* — Morgan, Lewis & Bockius LLP

(57) ABSTRACT

A sensor apparatus is provided for transmitting data of a polished rod in a rod pumping system, the rod pumping system including a rod rotator that rotates the polished rod. The sensor apparatus includes an outer shell configured to receive the polished rod, a signal processor within the outer shell, a position sensor within the outer shell and configured to sense and output to the signal processor a position signal, and a magnetic pickup sensor configured to sense and output to the signal processor a signal indicating a sensed magnetic field. The signal processor is configured to count a number of strokes of the polished rod based on the position signal, and to determine whether a fault exists based on the number of strokes and the signal indicating the sensed magnetic field.

8 Claims, 9 Drawing Sheets

POLISHED ROD ROTATION SENSOR

TECHNICAL FIELD

The present disclosure relates generally to rod pumping systems, and more particularly, to an apparatus for detecting rotation of a rod rotated by a rod rotator in a rod pumping system.

BACKGROUND

In the field of oil well rod pumping systems, it can be desirable to rotate the polished rod to extend the life of the system. Such rotation may provide uniform wear between the sucker rod and the tubing. Furthermore, the formation of deposits such as paraffin on the tubing and sucker rod may be prevented by the rotation together with scrapping mechanisms or rod guides installed between or on the sucker rod or tubing.

The rotation of the polished rod may be performed by a rod rotator, which may be installed between the polished rod clamp and the carrier bar. However, in certain circumstances, the polished rod may not rotate as desired. This can be due to a rod rotator malfunction or other system problem, and indicates that the sucker rod and tubing are not achieving uniform wear and deposit prevention. There is a need to efficiently detect rotation malfunction in such scenarios.

SUMMARY

Accordingly, the present disclosure is directed to a rod rotation detector for a rod pump system that substantially obviates one or more of the problems due to limitations and disadvantages of the related art.

In an aspect of the present disclosure, a sensor apparatus is provided for transmitting data of a polished rod in a rod pumping system, the rod pumping system including a rod rotator that rotates the polished rod, and the sensor apparatus includes an outer shell configured to receive the polished rod; a signal processor within the outer shell; a position sensor within the outer shell and configured to sense and output to the signal processor a position signal; and a magnetic pickup sensor configured to sense and output to the signal processor a signal indicating a sensed magnetic field; wherein the signal processor is configured to count a number of strokes of the polished rod based on the position signal, and to determine whether a fault exists based on the number of strokes and the signal indicating the sensed magnetic field.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of embodiments of the disclosure and are incorporated in and constitute a part of this application, illustrate embodiments of the disclosure that together with the description serve to explain various principles of the disclosure. In the drawings.

DETAILED DESCRIPTION

Reference will now be made in detail to embodiments of the present disclosure, examples of which are illustrated in the accompanying drawings. Same or similar reference numbers may be used to indicate same or similar parts.

Figure 1A:
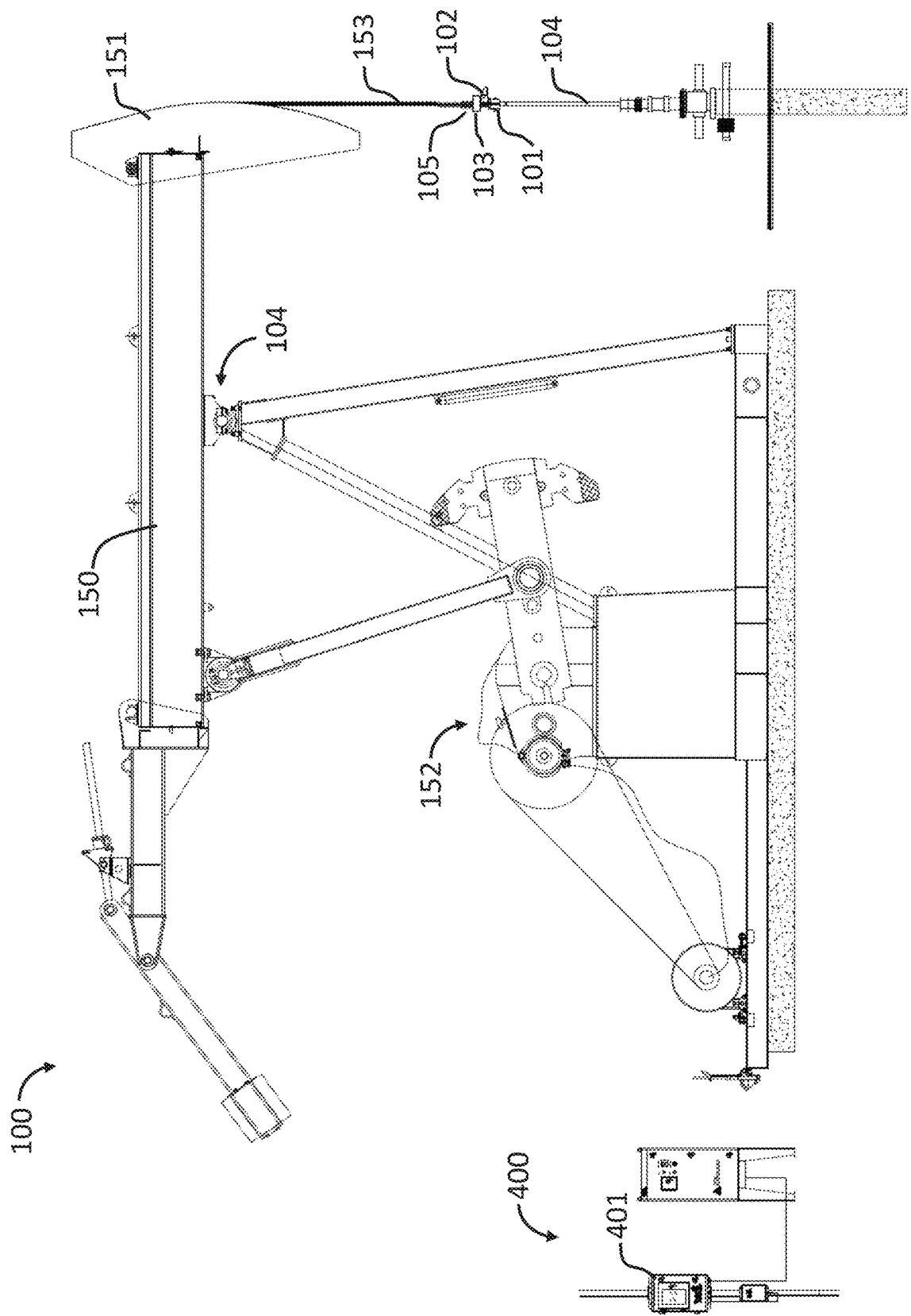
FIG. 1A illustrates an example rod pumping system together with a sensor apparatus having a rod rotation detector according to an embodiment of the present disclosure.

FIG. 1A illustrates a rod pumping system 100, which may be used to pump oil, together with a sensor apparatus 102 according to an embodiment of the present disclosure. The example rod pumping system 100 includes a walking beam 150, horsehead 151, motor and gear drive 152, hanger harness 153, polished rod 104, polished rod clamp 105, carrier bar 101, and rod rotator 103.

Figure 1B:
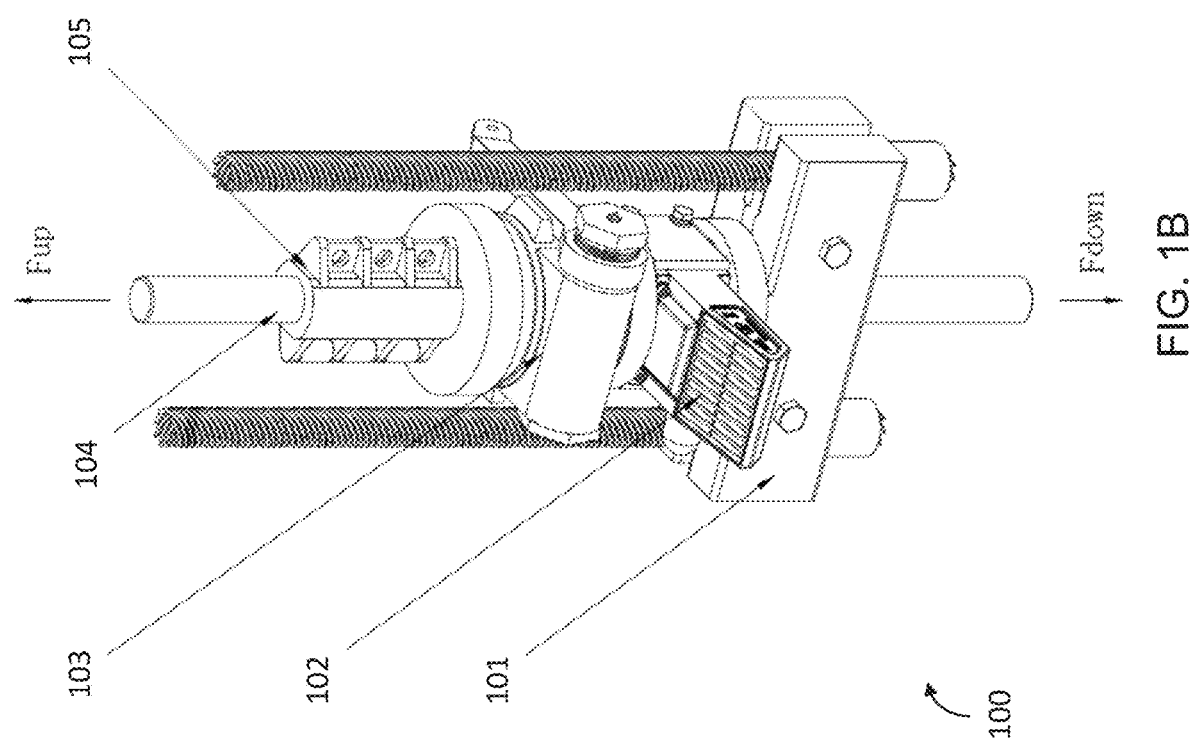
FIG. 1B is a perspective view of a portion of a rod pumping system with a sensor apparatus having a rod rotation detector according to an embodiment of the present disclosure.

FIG. 1B illustrates, in more detail, a portion of the rod pumping system 100, including the polished rod 104, polished rod clamp 105, carrier bar 101, rod rotator 103, and sensor apparatus 102. Each time the polished rod moves up and down during operation of the rod pumping system 100, the rod rotator 103 may incrementally rotate the polished rod 104 a portion of a turn to provide uniform wear and the prevention of deposit build-up.

During operation, sensor apparatus 102 may measure axial forces on the polished rod 104. For example, as the pumping system 100 operates, the polished rod 104 may be subject to both an axially upward force or strain $F_{up}$ and an axially downward force or strain $F_{down}$. The sensor apparatus 102 may be placed between other components, such as the carrier bar 101 and the rod rotator 103, and may thereby directly measure the combined upward and downward forces $F_{up}$ and $F_{down}$ exerted on the polished rod 104. Additionally, the sensor apparatus 102 may measure its position, which may be representative of the inclination of a walking beam 150 of the rod pump system 100 or the position of the polished rod 104.

The sensor apparatus 102 may be configured such that it is easily placed between the existing carrier bar 101 and polished rod clamp 105 or rod rotator 103 of the rod pumping system 100, without requiring the removal of the polished rod clamp 105 or rod rotator 103. For example, a gap may be provided between the carrier bar 101 and the rod rotator 103, and the sensor apparatus 102 may be laterally placed within this gap such that a u-shaped portion 212 of the sensor apparatus 102 receives the polished bar 104. By including a position sensor in the sensor apparatus 102, the sensor apparatus may perform the measurements of an inclinometer, while being conveniently attachable to the rod pumping system 100, in contrast to placing an inclinometer on the walking beam 150.

Figure 3A:
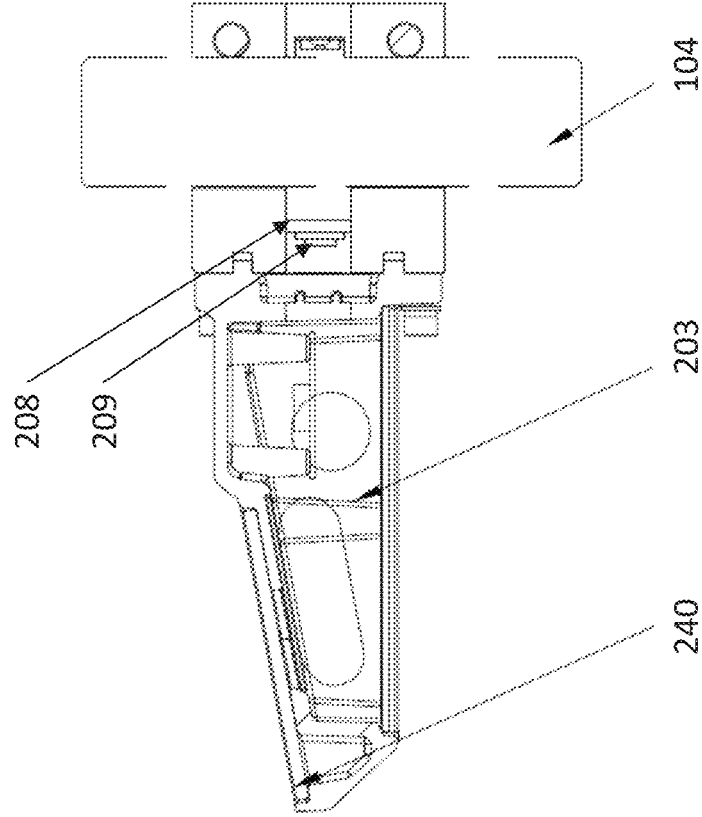
FIGS. 3A and 3B are side and top cross section views of a sensor apparatus having a rod rotation detector according to an embodiment of the present disclosure.
Figure 3B:
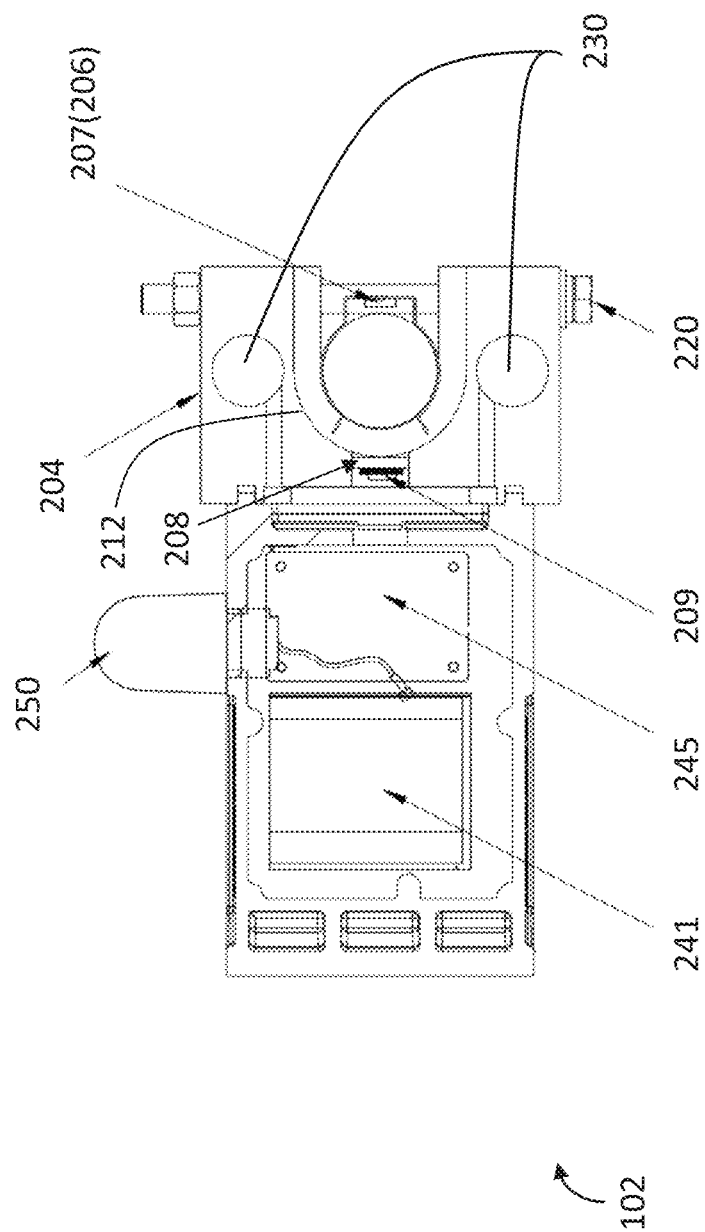
Figure 4:
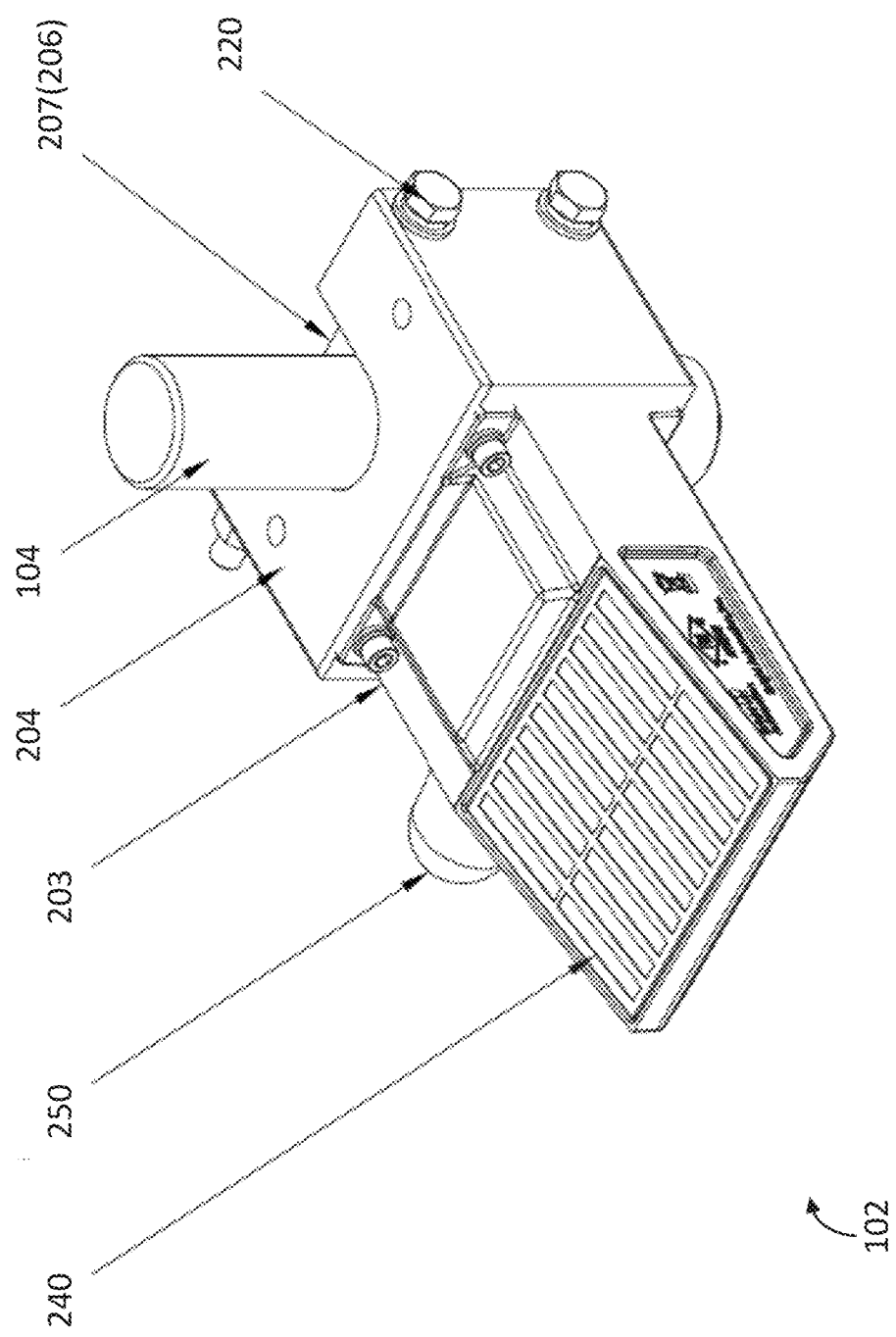
FIG. 4 is a perspective view of a sensor apparatus having a rod rotation detector according to an embodiment of the present disclosure.

The sensor apparatus 102 may directly measure the combined upward and downward forces $F_{up}$ and $F_{down}$ exerted on the polished rod 104 through transducer(s)/load sensor(s) 230 (see FIG. 3B). This ability to directly measure the forces on the polished rod 104 enables the sensor apparatus 102 to accurately measure the load. As will be discussed below, the sensor apparatus 102 may be capable of independently providing power to itself and may internally include all the circuitry necessary to process the reading from transducers 230 and wirelessly transmit the resulting load signal to a receiver or other monitoring system.

Figure 2:
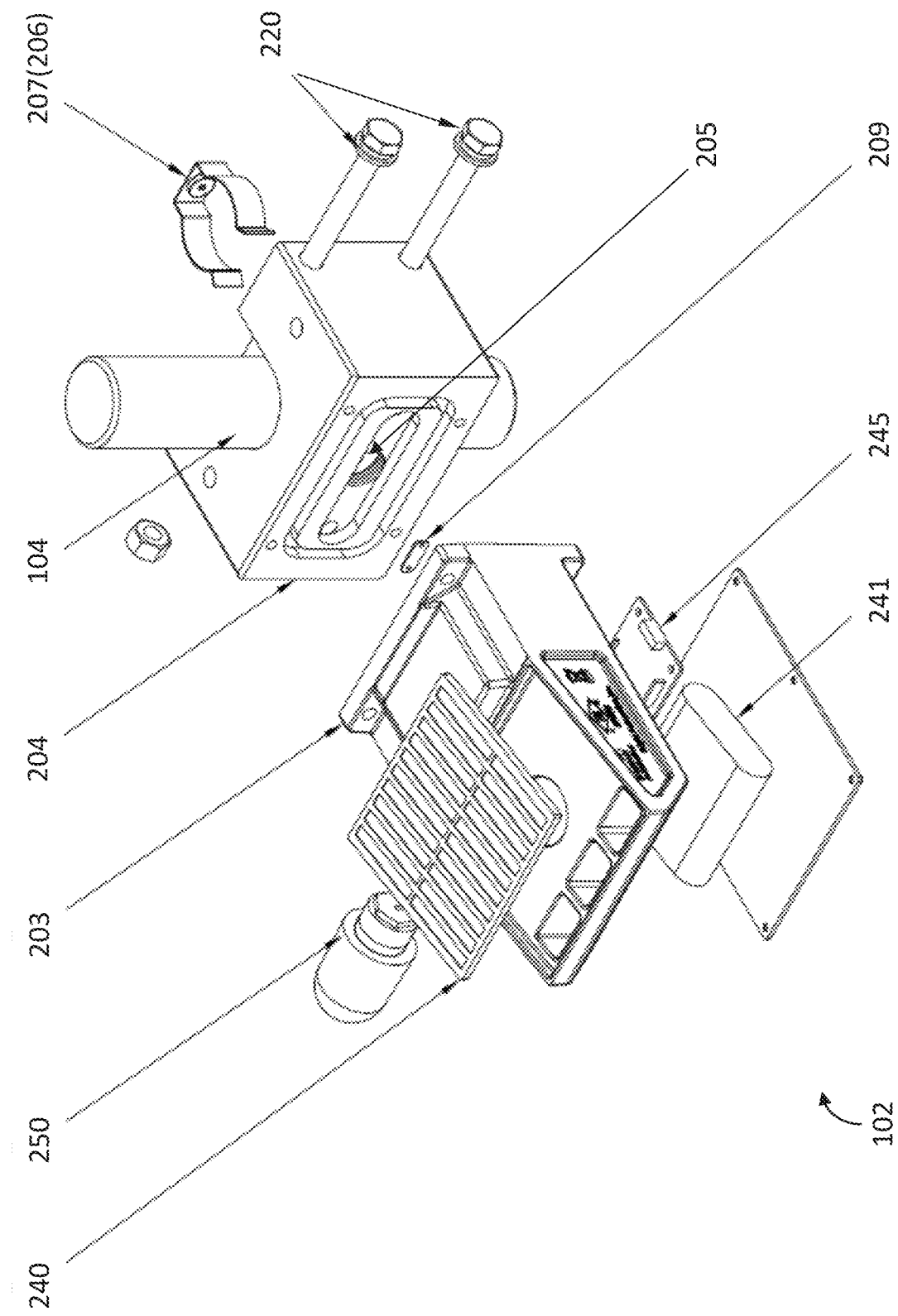
FIG. 2 is an exploded perspective view of a sensor apparatus having a rod rotation detector according to an embodiment of the present disclosure.

With reference to FIG. 2, in some embodiments, the sensor apparatus 102 may include the position sensor as part of circuit board 245. The position sensor may be configured to receive a power supply voltage and output a "position" signal based on a position experienced by the position sensor. As will be discussed below, the sensor apparatus 102 may internally include all the circuitry necessary to process the reading from position sensor and wirelessly transmit the resulting position signal to a receiver or other monitoring system.

FIG. 3B shows a top view of a sensor apparatus 102 according to an embodiment of the present disclosure. This sensor apparatus 102 may include an outer shell having a u-shaped portion 212 formed by a gap in the outer shell. In some embodiments, this u-shaped portion 212 is included in a fixing base 204 of the sensor apparatus 102. The u-shaped portion 212 may have two laterally protruding portions and may be sized to receive the polished rod 104 when the sensor apparatus 102 is installed in a rod pumping system. In example embodiments, the outer shell is made of metal. The u-shaped portion 212 of the outer shell 210 may have a surface that is continuously smooth.

After the u-shaped portion 212 of the sensor apparatus 102 is placed around the polished rod 104 at installation, the sensor apparatus 102 may be laterally secured to the polished rod 104 with fixing mechanisms 220. For example, fixing mechanisms 220 may be inserted in holes of the laterally protruding portions of the u-shaped portion 212. Fixing mechanisms 220 may be or resemble a bolt or screw, and may each be secured to the sensor apparatus 102 by use of a nut and/or washer 221. The two fixing mechanisms 220 are placed at upper and lower positions in the u-shaped portion 212 relative to the top and bottom of the sensor apparatus 102, such that they are not at a center portion relative to a vertical direction of the polished rod 104.

The u-shaped portion 212 of the sensor apparatus 102 may be sized such that a gap is provided between it and the polished rod 104 when installed. In this way, the polished rod 104 may rotate freely relative to sensor apparatus 102, and sensor apparatus 102 is held in place by devices positioned above and below it on the polished rod 104—such as the rod rotator 103 and carrier bar 101. Thus, once the sensor apparatus 102 is secured to the polished rod 104, the polished rod 104 may rotate relative to the sensor apparatus 102 within the u-shaped portion 212.

The sensor apparatus 102 in accordance with embodiments of the present disclosure may be relatively maintenance free. However, if the sensor apparatus 102 needs to be removed from the rod pumping system 100 for any reason, this may easily be done by first removing the fixing mechanisms 220 and then removing sensor apparatus 102 laterally from the polished rod 104.

With reference to FIG. 3B, the sensor apparatus 102 may include two of the transducers 230 (also herein referred to as "load sensors"). The load sensors 230 may include flat bottom surfaces that protrude on the bottom side of the sensor apparatus 102 and that are configured to make physical contact with the carrier bar 101. In example embodiments, because the structure of the sensor apparatus 102 is such that it can be placed between this carrier bar 101 and the rotator 103, the transducers 230 of the sensor apparatus 102 can measure both upwards and downwards axial forces exerted on the polished rod 104. The sensor apparatus 102 may be configured such that when it is installed, the flat surfaces of the transducers 230 are flush with the carrier bar 101, and a top surface of the outer shell is flush with the rotator 103 or with the polished rod clamp 105. In this way, the forces acting upon the sensor apparatus 102 may accurately and directly reflect the forces acting upon the polished rod 104.

By application of an input voltage, the transducers 230 may convert the forces they experience into electrical signals. These transducers 230 may be, for example, strain gauge transducers, which can change resistance based on the strain they experience. However, other types of transducers may be used. For example, in some embodiments, the transducers may be of semiconductor type.

The transducers 230 may receive input voltage (power) and output a voltage reading that varies based on strain. For example, strain gauges of the transducers 230 may detect the deformation of the metal elements of the transducers 230 due to an applied force, and send a signal corresponding to this deformation so as to detect the variation of the applied force. Furthermore, as will be discussed below, the transducers may receive voltage from a power source integrated inside the outer shell of the sensor apparatus 102, thereby eliminating the need for an external power source.

The two transducers 230 may be cylindrically shaped and arranged so as to be diametrically opposed across the gap forming the u-shaped portion 212 relative to a position of the polished rod 104. This placement of the two transducers 230 may allow them to measure the entire upward and downward force exerted on the polished rod 104 without the need to completely encircle the polished rod 104. Because the transducers do not need to encircle the polished rod 104, this placement also allows the sensor apparatus 102 to be easily installed in an existing rod pumping system without having to "stack" the sensor apparatus 102 from the top of the polished rod.

The transducers 230 may be placed at the bottom of the sensor apparatus 102. This placement at the bottom of the sensor apparatus 102 may protect the transducers from the outdoor elements. Meanwhile, the transducers 230 are centered and secured by bolts 231, which are inserted from the top of the sensor apparatus 102. In one embodiment, these bolts 231 may be hexagon bolts such as those having international grade number GB/T70.1.

With reference to FIGS. 2 and 3B and as noted above, the sensor apparatus 102 may include the position sensor on circuit board 245. In an example, the position sensor may be circuitry including an accelerometer (e.g., an integrated circuit (IC)) that measures moving acceleration. For example, in some embodiments, the position sensor may include accelerometer circuitry such as, for example, the Analog Devices™ ADXL203 accelerometer.

The position sensor may output an electrical signal (a "position signal") that may be used to determine the position of the polished rod 104 and/or inclination of the walking beam 150. Such a determination may be performed by a processor such as signal processor 544 (discussed below in relation to FIGS. 6A and 6B).

In embodiments where the position sensor is an accelerometer that measures the moving acceleration, the signal processor 544 may determine the moving distance of the sensor apparatus (corresponding to the moving distance of the polished rod/horse head) according to Equation 1-1:

$$S = \int\int_{t1}^{t2} a(t)dtdt \qquad [1\text{-}1]$$

In the above Equation 1-1, 'S' represents the moving distance of the sensor apparatus, 'a(t)' represents the acceleration of the sensor apparatus as measured by position sensor, 't1' represents the starting time for the integral function, and 't2' represents the end time for the integral function. According to this equation, the moving distance of the sensor apparatus from time 't1' to time 't2' equals two times the integral of the measured acceleration from time 't1' to time 't2'.

A position of the polished rod 104 and/or angle of the walking beam 150 may thereby be determined according to the calculated moving distance of the sensor apparatus and known parameters of the rod pumping system 100, such as, for example, the lengths of the walking beam 150, horsehead 151, harness 153, polished rod 104, and position of pivot point 104, according to common trigonometric equations that are known in the art.

In some embodiments, the position sensor may include circuitry to measure the moving angle directly by, for example, sensing changes to tilt. This may also be accomplished with an accelerometer such as the Analog Devices™ ADXL203 accelerometer, although this example is provided for illustration only and embodiments are not limited thereto.

In some embodiments, and with reference to FIG. 2, the outer shell of the sensor apparatus 102 includes a slanted portion. This slanted portion may include solar panel(s) 240 for providing power to the sensor apparatus 102. In contrast to other elements of the sensor apparatus 102, the solar panels 240 may be mounted externally on the outer shell. In one embodiment, the solar panels 240 may be connected in parallel to a charger and an electrical power storage 241 such as a battery. Furthermore, the solar panels 240, power storage 241, a signal processor on circuit board 245, and a wireless transmitter included within antenna 250, may be successively connected in parallel, as will be discussed in more detail below with regard to the embodiments shown in FIGS. 6A and 6B. Various structural support may exist for the circuit board 245. The solar panels may produce current from incident light.

The slanted portion of the sensor apparatus 102 including at least the solar panels 240 and power storage 241 may form part of a main body 203 of the sensor apparatus 102. This main body 203 may additionally include the circuit board 245. The main body 203 may be easily attachable and detachable from the fixing base 204 of sensor apparatus 102 through use of bolts, screws, or other fastening mechanisms. In this way, the sensor apparatus 102 can provide an integrated, encapsulated package that has all the desired functionality while still allowing the power storage/battery 241 to be easily replaced as it ages.

In some embodiments, the wireless transmitter is mounted inside the outer shell as part of an antenna 250 that protrudes outside the outer shell and that is protected from the outdoor elements by a cover. This antenna cover may be plastic or another material that limits interference with wireless signals. The wireless transmitter may transmit load data to, for example, a nearby receiver, station, or other device that can monitor the measured load on the polished rod 104.

For example, with reference to FIG. 1, in some embodiments of the disclosure, the wireless transmitter may transmit data via the antenna to, for example, a nearby receiver, station, or other device that can monitor the measured load on the polished rod 104, position of the polished rod 104, and/or incline of the walking beam 150. For example, the wireless transmitter may transmit modulated position/incline and load data to a wireless receiver module 401 connected to a rod pump controller 400 in order that the rod pumping system 100 may be appropriately controlled and monitored. As will be discussed below, the wireless transmitter may also transmit a signal indicating a fault condition of the rod rotation.

Figure 6A:
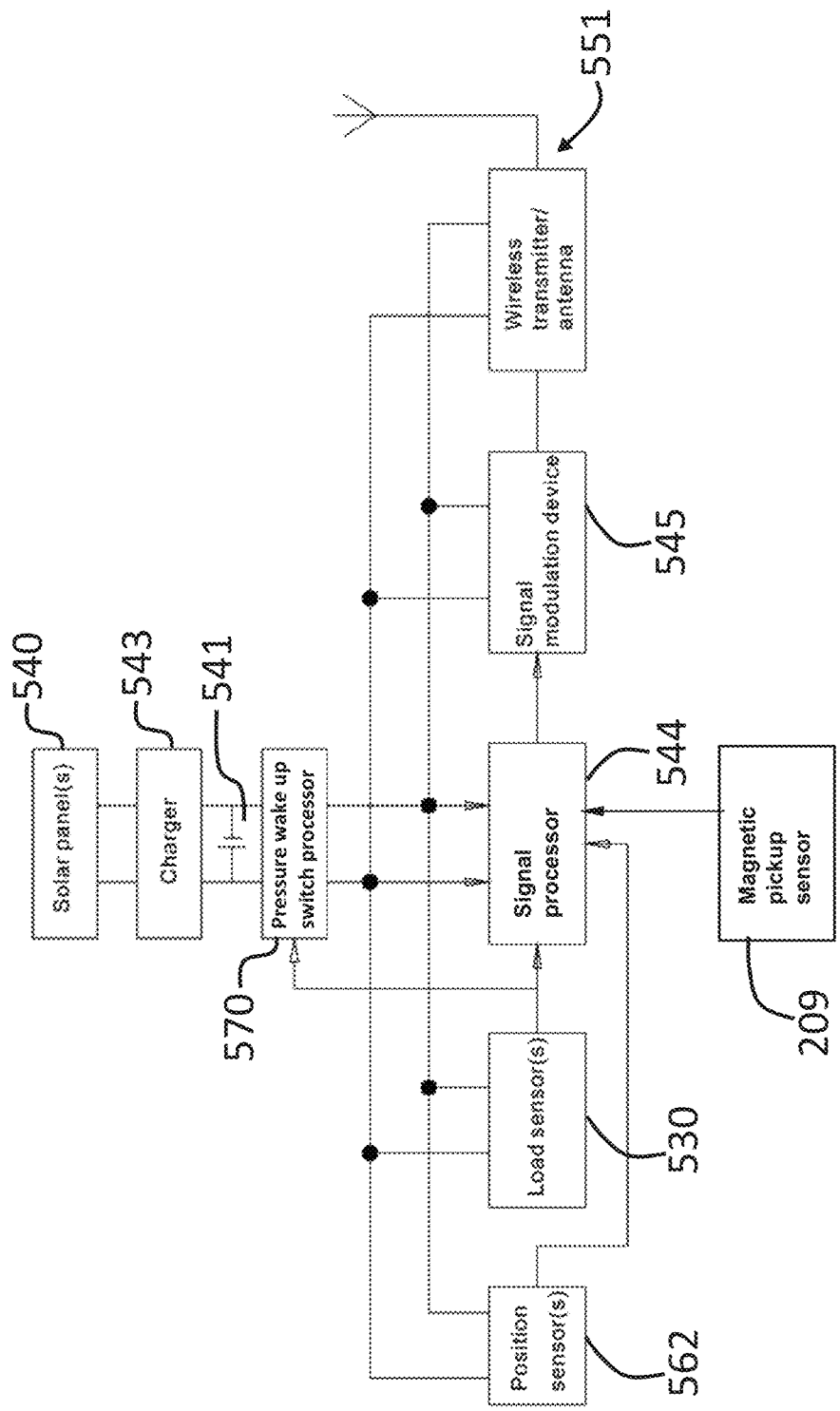
FIG. 6A illustrates a block diagram of circuitry of a sensor apparatus having a rod rotation detector according to an embodiment of the present disclosure.

FIG. 6A illustrates a schematic circuit configuration of the sensor apparatus 102 according to an embodiment of the present disclosure. The circuit configuration may include solar panel(s) 540, a charger 543, a power storage/battery 541, a load and position signal processor 544, a signal modulation device 545, a wireless transmitter/antenna 551, and load sensor(s) 530. Furthermore, the circuit configuration may include a position sensor(s) 562. The processor 544 may operate based on instructions stored in a non-transitory computer-readable storage medium (not shown).

Figure 6B:
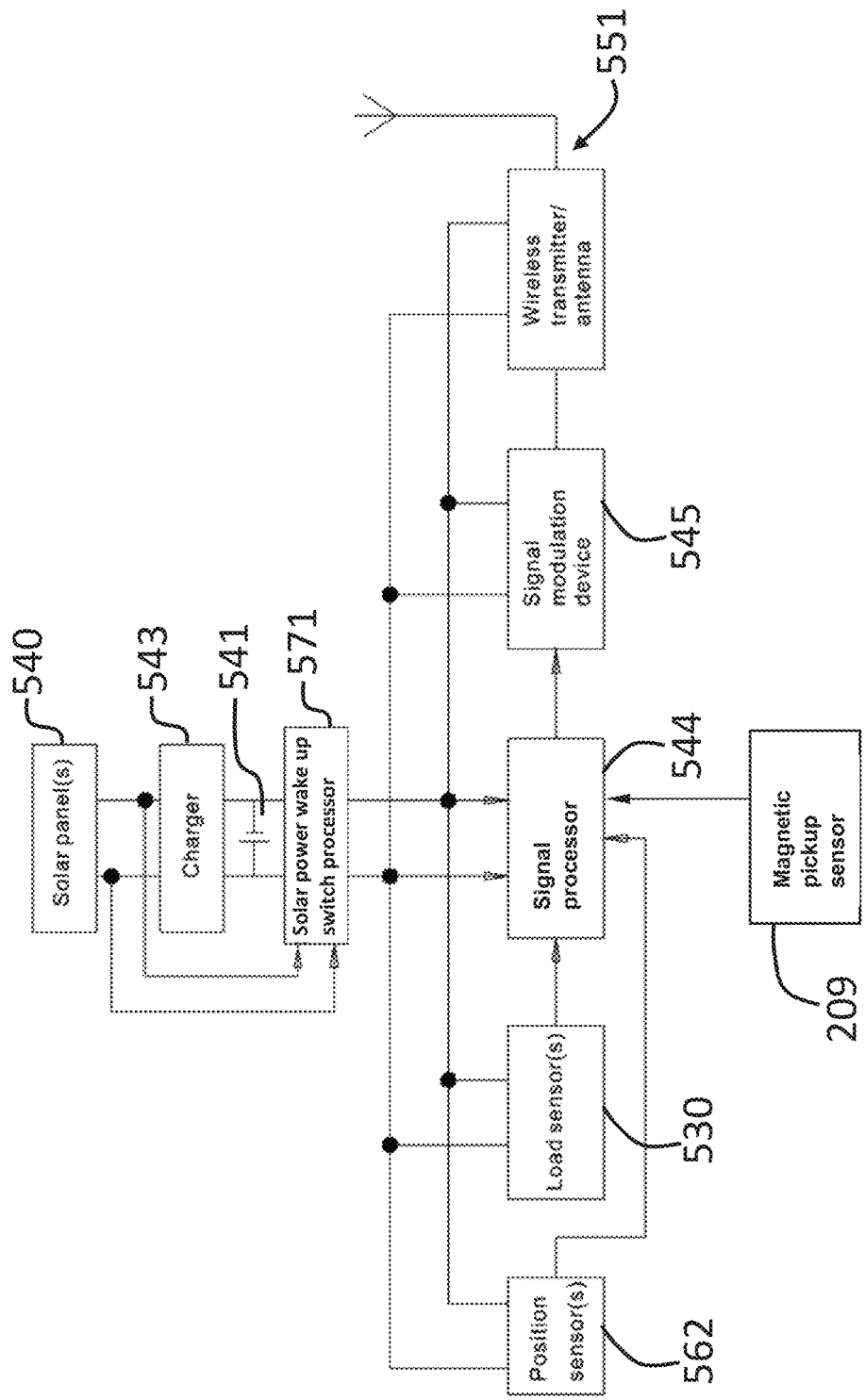
FIG. 6B illustrates a block diagram of circuitry of a sensor apparatus having a rod rotation detector according to an embodiment of the present disclosure.

While FIGS. 6A and 6B illustrate an example configuration that includes position sensor(s) 562 and a signal processor 544 that processes load, position, and magnetic pickup signals (to be discussed below), embodiments are not limited thereto. In some embodiments, the signal processor 544 may include separate signal processors for each of these signals, or a combination of these signals.

While FIG. 6A shows signal modulation device 545 separate from the wireless transmitter 551, in some embodiments, the signal modulation device 545 may be included as part of the wireless transmitter 551. Furthermore, in some embodiments, the modulation device 545 or wireless transmitter 551 can include an amplifier and/or other transmission equipment. In some embodiments, the charger 543 may be included on the same circuit board as circuitry for the signal modulation device 545 and/or load and position signal processor 544. The solar panel 540 is used to generate and supply electricity to the sensor apparatus 102, and may comprise a set of solar photovoltaic modules electrically connected and mounted to an outer shell of the sensor apparatus 102. The solar panel 540 may be connected to the charger 543 and the power storage/battery 541. The charger 543 may receive current from the solar panel 540 and charge the power storage/battery 541 with energy based on this current. The power storage/battery 541 is further connected to the signal processor 544, the signal modulation device 545, the load sensors 530, and the position sensor(s) 562, to supply power to those elements.

The load sensors 530 may be configured to measure and transmit load signals to the signal processor 544. And, as discussed above, the position sensor(s) 562 may be included in some embodiments, and may be configured to measure and transmit a position signal based on a position experienced by the position sensor(s) 562 (such as acceleration) to the signal processor 544.

The signal processor 544 may receive the load signals from the load sensors 530, calculate a load experienced by the polished rod 104 based on these load signals, and output this processed load signal data. For example, the signal processor 544 may perform this calculation based on a recognition that the load experienced by the polished rod 104 is proportional to the sum of the load signals from both load sensors 530. The processed load signal data may be further transmitted to the load signal modulation device 545 (which, in some embodiments, is included in wireless transmitter 551) to perform signal modulation. After the load signal data is processed and modulated, it may be amplified and transmitted via the wireless transmitter/antenna 551.

Furthermore, the signal processor 544 may receive the signal(s) from the position sensor(s) 562, calculate a position of the polished rod 104 and/or inclination of the walking beam 150 based on the signal(s) from the position sensor(s) 562 and according to Equation 1-1 discussed above, and output this processed position and/or inclination data. As with the processed load signal data, the processed position and/or inclination data may be further transmitted to the signal modulation device 545 to perform signal modulation. After the position and/or inclination data is processed and modulated, it may be amplified and transmitted via the wireless transmitter/antenna 551. Therefore, in some embodiments, the sensor apparatus 102 may simultaneously measure load and position data and transmit the load and position data.

In embodiments of the present disclosure, as the solar panel 540 supplies power to the charger 543 and the power storage/battery 541, any electric cable connected to an exterior power source is eliminated. Therefore, embodiments in accordance with the present disclosure may improve the energy efficiency and facilitate the maintenance of the sensor apparatus 102 equipment. In embodiments of the disclosure, the above circuitry may include non-transitory computer readable storage mediums for providing appropriate instructions to the processor(s).

Furthermore, in some embodiments of the disclosure, signal processing may be employed to decrease energy loss. The solar panels 540, charger 543, and electrical power storage 541 may help to ensure stable or constant current for the sensor apparatus 102 even during cloudy days, night time, or other low-light situations. In some embodiments of the disclosure, the power supply may connect to the load sensor(s) 230, position sensor 562, load and position signal processor 544, and signal modulation device 545 in parallel.

In some embodiments of the disclosure, there may be no contact switch provided on the sensor apparatus 102 to control power to the circuitry. Instead, there may be a wake up switch processor between the charger, battery and other circuitry which consumes energy. This wake up switch processor may "turn on" the battery and the rest of the energy consumption circuitry and serve the function of a switch. By using a wake up switch processor instead of a contact switch, there is no possibility for water to enter the interior of the sensor apparatus 102 through such a switch. Furthermore, accidental switches to "power on" may be avoided during transport. The wake up switch processor may be located on a same circuit board (e.g., circuit board 245 of FIG. 2) as other circuitry.

As shown in FIG. 6A, in some embodiments, the wake up switch processor may include a pressure wake up switch processor 570. The pressure wake up switch processor 570 may be configured to measure the pressure on the sensor apparatus 102 once every several seconds. For example, once every two seconds, the pressure wake up switch processor 570 may provide a voltage to the load sensor(s) 530 from power storage 451 and measure the pressure based on the load signals transmitted from the load sensor(s) for a short time of 20 milliseconds. When, for example, the sensor apparatus 102 is installed on the polished rod and has a pressure corresponding therewith, the pressure wake up switch processor may detect this pressure and fully "turn on" power to the circuitry.

As shown in FIG. 6B, in some embodiments, the wake up switch processor may include a solar power wake up switch processor 571. The solar power wake up switch processor 571 may be configured to measure a voltage and/or current of the solar panel(s) 540. When, for example, the solar power wake up switch processor 571 detects more than dark current from the solar panel(s) 540, the solar power wake up switch processor 571 may "turn on" power to the circuitry. For example, before being installed on a polished rod, the solar panel(s) 540 of the sensor apparatus 102 may be covered with a black plastic foil such that substantially only a dark current flows from the solar panel(s) 540. This black foil may be removed at installation. In this way, the solar power wake up switch processor 571 may detect when the sensor apparatus 102 is installed in an oil rod pumping system and therefore turn the system on.

Furthermore, with reference to FIG. 3B, the sensor apparatus 102 may include a magnetic pickup sensor 209 positioned at the u-shaped portion 212 to be proximate to the polished rod 104. The magnetic pickup sensor 209 may have a line-of-site to the polished rod 104 through a hole 205 in the fixing base 204. For example, the magnetic pickup sensor 209 may be located within the hole 205. In one example, the hole 205 is threaded, and magnetic pickup sensor 209 is on a threaded base 208 that is screwed into the hole 205. The threaded base 208 may be made of plastic or another non-magnetic material. FIGS. 3A and 3B illustrate the magnetic pickup sensor 209 on a side of the plastic threaded base 208 opposite to the polished rod 104, which may help protect the magnetic pickup sensor 209 from environmental conditions such as weather and oil. However, embodiments are not limited thereto. In another example embodiment, the magnetic pickup sensor 209 may be on a same side of the plastic threaded base 208 as the polished rod 104, such that the magnetic pickup sensor 209 is separated from the polished rod 104 only by air.

The magnetic pickup sensor 209 may vary its output (e.g., output voltage) in response to a magnetic field. For example, the magnetic pickup sensor 209 may output a voltage indicative of the location of a magnet 206, discussed further below, to the sensor apparatus circuitry, such as signal processor 544.

Fixing mechanism 207, such as a bracket or clip, may attach the magnet 206 to the polished rod 104. The fixing mechanism 207 may be spring-loaded so that it can move on the polished rod if enough force is applied. This may avoid damage to the sensor apparatus 102, fixing mechanism 207, and magnet 206 as the system operates. Furthermore, this may allow easy attachment and detachment of the fixing mechanism 207 and magnet 206 from the polished rod 104.

Figure 5:
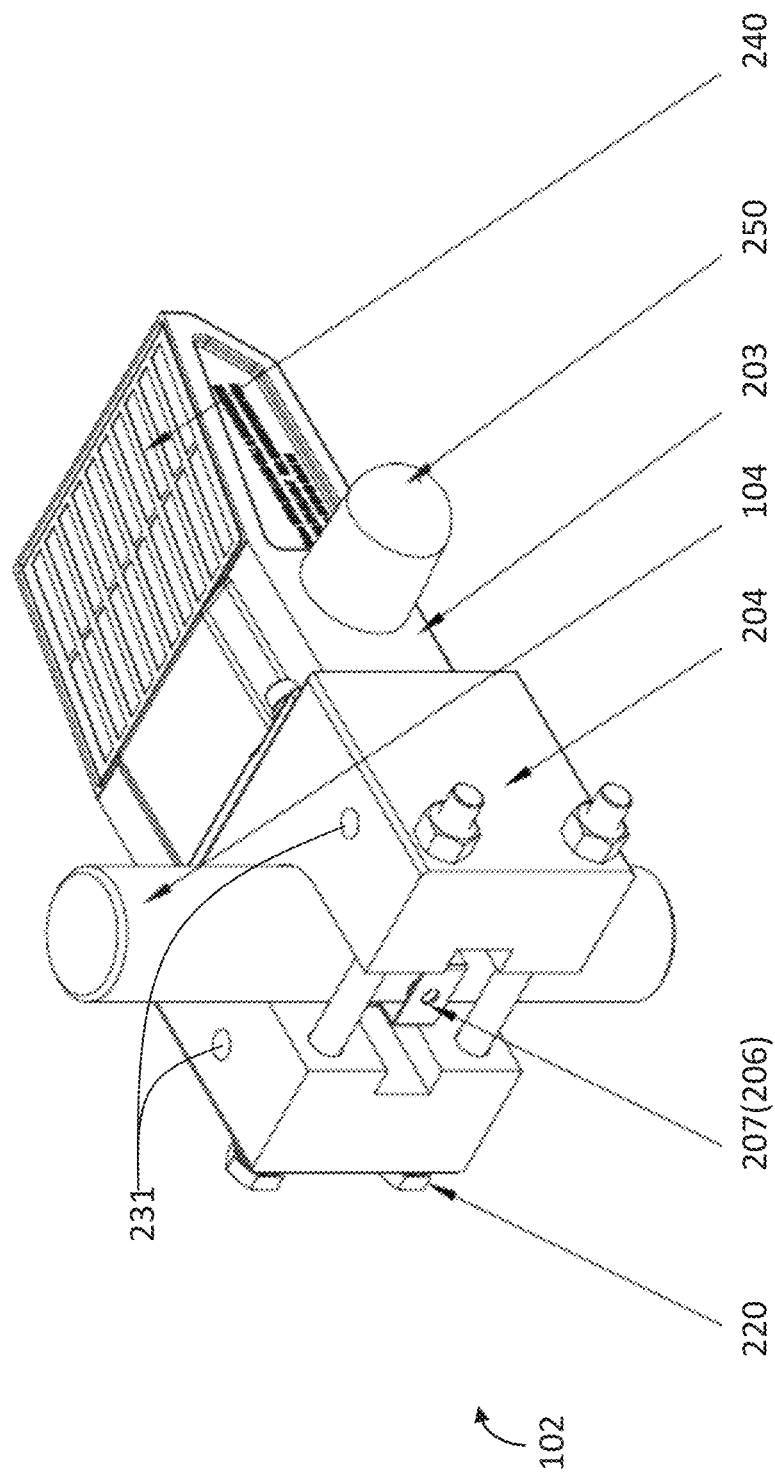
FIG. 5 is another perspective view of a sensor apparatus having a rod rotation detector according to an embodiment of the present disclosure.

As shown in the example of FIG. 5, the fixing base 204 of the sensor apparatus 102 may include a groove in both sides of the u-shaped portion 212 to allow the easy attachment and detachment of the fixing mechanism 207 and magnet 206 from the polished rod 104. Furthermore, these grooves may provide space for the fixing mechanism 207 and magnet 206 to rotate freely with the polished rod 104 as it is rotated by the rod rotator 103. The grooves may be at a center of the fixing base 204 relative to its top and bottom. As described above, the two fixing mechanisms 220 are placed at upper and lower positions in the u-shaped portion 212 relative to the grooves, such that the fixing mechanism 207 and magnet 206 can be attached and detached without interference from the fixing mechanisms 220, or for the need to remove them.

As described above, the rod rotator 103 may rotate the polished rod 104 a known portion of a turn each time the polished rod moves up and/or down (e.g., "strokes"). Thus, the polished rod, together with magnet 206, may be known to make a certain number of strokes by the time it makes a complete, 360° rotation.

The signal processor 544 and associated circuitry inside the sensor apparatus 102 may use the position information provided by position sensor 562 to count the number of strokes of the polished rod 104. In an example, this counting may be initiated each time the magnetic pickup sensor 209 indicates to the signal processor 544 that the magnet 206 has passed by (e.g., has been in closest proximity). By the time the signal processor 544 counts a number of strokes that correspond to a complete rotation of the polished rod 104 during normal operation, the magnetic pickup sensor 209 should again indicate to the signal processor that magnet 206 has passed by.

If the signal processor 544 does not receive indication from magnetic pickup sensor 209 that the polished rod has completed a rotation by this time, this may indicate a fault condition. In this case, the signal processor 544 may wirelessly transmit a signal via wireless transmitter/antenna 551 to indicate the fault. For example, wireless transmitter/antenna 551 may transmit a fault signal to wireless receiver module 401 connected to rod pump controller 400 so that appropriate action may be taken. Such action maybe include, e.g., ceasing operation of the rod pumping system 100, or alerting an operator to the fault condition.

Any reference in the specification to "one embodiment" or "an embodiment" means that a particular feature, structure or characteristic described in connection with the embodiment is included in at least one embodiment of the disclosure. The appearances of the phrase "in one embodiment" at various places in the specification do not necessarily all refer to the same embodiment.

It will be apparent to those skilled in the art that various modifications and variations can be made in the rod rotation detector of the present disclosure without departing from the spirit or scope of the disclosure. Thus, it is intended that the present disclosure cover the modifications and variations of this disclosure provided they come within the scope of the appended claims and their equivalents.

What is claimed is:

1. A sensor apparatus for transmitting data of a polished rod in a rod pumping system, the rod pumping system including a rod rotator that rotates the polished rod, and the sensor apparatus comprising:
an outer shell configured to receive the polished rod;
a signal processor within the outer shell;
a position sensor within the outer shell and configured to sense and output to the signal processor a position signal; and
a magnetic pickup sensor configured to sense and output to the signal processor a signal indicating a sensed magnetic field from a magnet, a spring-loaded fixing mechanism including the magnet, wherein the fixing mechanism is configured to be attached to the polished rod;
wherein the signal processor is configured to count a number of strokes of the polished rod based on the position signal, and to determine whether a fault exists based on the number of strokes and the signal indicating the sensed magnetic field.

2. The sensor apparatus of claim 1, further comprising:
a wireless transmitter,
wherein the signal processor wirelessly transmits, via the wireless transmitter, a fault signal when the signal processor determines that the fault exists.

3. The sensor apparatus of claim 1, wherein:
the magnetic pickup sensor is positioned in the sensor apparatus, and the signal indicating the sensed magnetic field is indicative of the proximity of the magnet.

4. The sensor apparatus of claim 3, wherein:
the signal processor determines whether the polished rod has completed a rotation based on the signal indicating the sensed magnetic field, and determines that the fault condition exists when the counted number of strokes exceeds an expected number of strokes for a complete rotation and the polished rod has not been determined to have completed a rotation.

5. The sensor apparatus according to claim 1, wherein:
the outer shell includes a u-shaped structure to receive the polished rod, and the u-shaped structure includes a groove to receive the spring-loaded fixing mechanism.

6. The sensor apparatus according to claim 3, wherein:
the outer shell includes a u-shaped structure to receive the polished rod;
the u-shaped structure includes a hole configured to face the magnet; and
the magnetic pickup sensor is within the hole.

7. The sensor apparatus according to claim 6, wherein:
the hole is threaded; and
the magnetic pickup sensor is on a threaded plastic base that is configured to be screwed into the hole.

8. The sensor apparatus according to claim 7, wherein:
the threaded plastic base is between the magnetic pickup sensor and the magnet.

* * * * *